US012774745B2

(12) United States Patent
Saito

(10) Patent No.: US 12,774,745 B2
(45) Date of Patent: Oct. 27, 2026

(54) HYDRAULIC PRESSURE SUPPLY DEVICE AND HYDRAULIC PRESSURE SUPPLY METHOD

(71) Applicant: HAWE Japan Ltd., Nagoya (JP)

(72) Inventor: Hirokazu Saito, Nagoya (JP)

(73) Assignee: HAWE Japan Ltd., Nagoya (JP)

( * ) Notice: Subject to any disclaimer, the term of this patent is extended or adjusted under 35 U.S.C. 154(b) by 65 days.

(21) Appl. No.: 18/363,119

(22) Filed: Aug. 1, 2023

(65) Prior Publication Data

US 2024/0060560 A1 Feb. 22, 2024

(30) Foreign Application Priority Data

Aug. 16, 2022 (JP) ................................ 2022-129743

(51) Int. Cl.
*F16H 61/00* (2006.01)

(52) U.S. Cl.
CPC . *F16H 61/0031* (2013.01); *F16H 2061/0037* (2013.01)

(58) Field of Classification Search
CPC .................. F16H 61/0031; F15B 2211/50536
USPC ........................................................ 60/429
See application file for complete search history.

(56) References Cited

U.S. PATENT DOCUMENTS

| | | | | |
|---|---|---|---|---|
| 2021/0262201 | A1* | 8/2021 | Saitoh | E02F 9/2289 |
| 2023/0349403 | A1* | 11/2023 | Elsik | F15B 1/033 |

FOREIGN PATENT DOCUMENTS

| | | | |
|---|---|---|---|
| CN | 2703153 | Y | 6/2005 |
| CN | 104265703 | A | 1/2015 |
| CN | 102937150 | A | 1/2016 |
| CN | 207972766 | U | 10/2018 |
| CN | 208203688 | U | 12/2018 |
| DE | 102012018724 | A1 | 3/2014 |
| JP | 2015-028367 | A | 2/2015 |

OTHER PUBLICATIONS

JP 2015028367 English Machine Translation (Year: 2015).*

* cited by examiner

*Primary Examiner* — Nicole Gardner
(74) *Attorney, Agent, or Firm* — DINSMORE & SHOHL LLP

(57) ABSTRACT

A hydraulic pressure supply device/method supplies constant hydraulic pressure for a certain time period even if trouble occurs. A hydraulic pressure supply device has a first connecting line, a pump that delivers hydraulic oil to the first line, a second connecting line to which the hydraulic oil is supplied from the first line, and a third connecting line to which the hydraulic oil returns from the second line, an accumulator connected to the first line, a pressure reducing valve reduces the hydraulic pressure oil introduced from the first to the second line, and a valve device discharges the oil in the first line into the third line. The second and first lines are connected only via the reducing valve. The valve device switches from not discharging to discharging the oil in the first line into the third when the pressure in the first connecting is above the first pressure.

3 Claims, 2 Drawing Sheets

HYDRAULIC PRESSURE SUPPLY DEVICE AND HYDRAULIC PRESSURE SUPPLY METHOD

CROSS REFERENCE TO RELATED APPLICATIONS

This application claims priority to Japanese Application 2022-129743, filed Aug. 16, 2022, which is hereby incorporated by reference in its entirety.

FIELD OF THE INVENTION

This invention is related to a hydraulic pressure supply device and hydraulic pressure supply method.

BACKGROUND OF THE INVENTION

JP 2015-028367A describes a hydraulic pressure unit as a hydraulic pressure supply device. This hydraulic pressure unit consists of a hydraulic pressure pump, an accumulator that stores the hydraulic oil discharged from the hydraulic pressure pump, and a non-leak type pressure reducing valve which connects the primary connecting line that introduces hydraulic oil from the accumulator and the secondary connecting line that discharges the introduced hydraulic oil, and at the same time, adjusts the pressure of the hydraulic oil in the secondary connecting line to a lower pressure than that in the primary connecting line. According to this pressure unit, the pressure of the hydraulic oil is sufficiently increased by the hydraulic pressure pump and stored in the accumulator, and the actuator connected to the pressure unit can be supplied with hydraulic oil at the required pressure by a non-leak type pressure reducing valve, thereby reducing the number of times the hydraulic pressure pump is driven and greatly improving energy efficiency.

In the hydraulic pressure supply device (hydraulic pressure unit) as described in JP 2015-028367 A, if there is any trouble (e.g., oil leakage) in the hydraulic pressure system from which the hydraulic pressure is supplied from the hydraulic pressure supply device, the number of times the pump is driven increases and the temperature of the hydraulic oil may rise. In addition, the hydraulic pressure supply device may not be able to supply a constant pressure of hydraulic pressure. In these cases, the mother machine that operates with the hydraulic oil supplied from the hydraulic pressure supply device may not be able to operate normally as it is, and the mother machine may have to be stopped. For that reason, it is desirable to provide a hydraulic pressure supply device and a hydraulic pressure supply method that can supply a constant pressure of hydraulic pressure for a certain period of time (e.g., until the end of a process in the operation of the mother machine) even if some trouble occurs in the hydraulic pressure system.

SUMMARY OF THE INVENTION

In light of such actual circumstances, the purpose of this invention is to provide a hydraulic pressure supply device and a hydraulic pressure supply method that can supply a certain pressure of hydraulic pressure for a certain period of time even if some trouble occurs in the connected hydraulic pressure system.

The hydraulic pressure supply device pertaining to this invention to achieve the above purpose consists of a first connecting line, a pump that delivers hydraulic oil to the aforesaid first connecting line, a second connecting line to which the aforesaid hydraulic oil is fed from the aforesaid first connecting line, a third connecting line to which the aforesaid hydraulic oil returns from the aforesaid second connecting line, an accumulator connected to the aforesaid first connecting line to store the aforesaid hydraulic oil delivered from the aforesaid pump, a pressure reducing valve that reduces the pressure of the aforesaid hydraulic oil introduced from the aforesaid first connecting line and then supplies it to the aforesaid second connecting line, and a valve device that discharges the aforesaid hydraulic oil from the aforesaid first connecting line into the third connecting line, wherein the aforesaid second connecting line is connected to the aforesaid first connecting line only via the aforesaid pressure reducing valve, and the aforesaid valve device switches from the state of not discharging the aforesaid hydraulic oil in the aforesaid first connecting line into the aforesaid third connecting line to the state of discharging the aforesaid hydraulic oil in the aforesaid first connecting line into the aforesaid third connecting line when the aforesaid hydraulic oil pressure in the aforesaid first connecting line is equal to or greater than the aforesaid first pressure.

A hydraulic pressure supply method pertaining to this invention to achieve the above purpose consists of a hydraulic oil delivery process to deliver hydraulic oil to the first connecting line, a supply process to supply the aforesaid hydraulic oil from the aforesaid first connecting line to the second connecting line, a return process to return the aforesaid hydraulic oil from the second connecting line to the third connecting line, a pressure accumulating process to accumulate the aforesaid hydraulic oil delivered from the aforesaid pump to the aforesaid first connecting line in an accumulator, a pressure reducing supply process to introduce the aforesaid hydraulic oil from the aforesaid first connecting line, reduce the pressure, and then supply it to the aforesaid second connecting line, and a discharge process to discharge the aforesaid hydraulic oil from the aforesaid first connecting line into the third connecting line, wherein the aforesaid pressure reducing supply process supplies only the aforesaid hydraulic oil that has been introduced from the aforesaid first connecting line and pressure reduced to the aforesaid second connecting line, and the aforesaid discharge process switches from a state in which the aforesaid hydraulic oil from the aforesaid first connecting line is not discharged into the aforesaid third connecting line to a state in which the aforesaid hydraulic oil from the aforesaid first connecting line is discharged into the aforesaid third connecting line if the pressure of the aforesaid hydraulic oil in the aforesaid first connecting line is equal to or greater than the first pressure.

According to the hydraulic pressure supply device and hydraulic pressure supply method of this invention, even if some trouble occurs in the connected hydraulic pressure system, it is possible to supply a constant pressure of hydraulic pressure for a certain period of time.

BRIEF DESCRIPTION OF THE DRAWINGS

The invention is described in detail below with reference to the drawings.

DETAILED DESCRIPTION OF THE INVENTION

The hydraulic pressure supply device and the hydraulic pressure supply method pertaining to this invention will be described below with reference to the figures.

Figure 1:
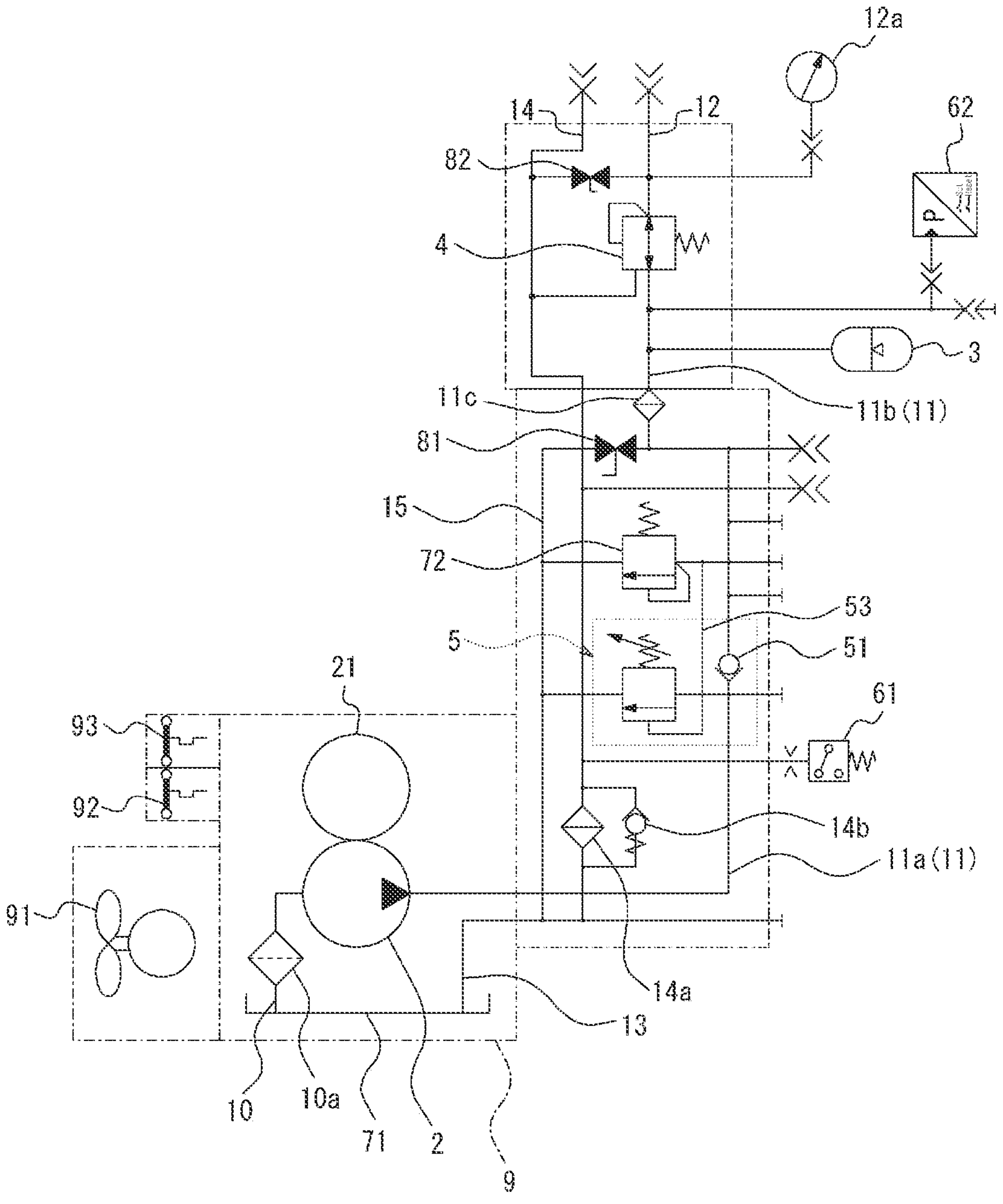
FIG. 1 is a hydraulic pressure circuit diagram of the hydraulic pressure supply device pertaining to this embodiment.

FIG. 1 shows a hydraulic pressure circuit diagram of the hydraulic pressure supply device pertaining to this embodiment.

First, an overview of the hydraulic pressure supply device pertaining to this embodiment will be described. The hydraulic pressure supply device pertaining to this embodiment consists of a first connecting line 11, a pump 2 that delivers hydraulic oil to the first connecting line 11, a second connecting line 12 to which the hydraulic oil is supplied from the first connecting line 11, a third connecting line 13 to which the hydraulic oil returns from the second connecting line 12, an accumulator 3 which is connected to the first connecting line 11 and stores the hydraulic oil delivered from the pump 2, a pressure reducing valve 4 that reduces the pressure of the hydraulic oil introduced from the first connecting line 11 and supplies it to the second connecting line 12, and a valve device 5 that discharges the hydraulic oil from the first connecting line 11 into the third connecting line 13. The second connecting line 12 is connected to the first connecting line 11 only via the pressure reducing valve 4.

The valve device 5 switches from a state in which the hydraulic oil in the first connecting line 11 is not discharged into the third connecting line 13 to a state in which the hydraulic oil in the first connecting line 11 is discharged into the third connecting line 13 when the hydraulic oil pressure in the first connecting line 11 is equal to or greater than the first pressure (16 MPa, as an example).

With the hydraulic pressure supply device pertaining to this embodiment which consists of a hydraulic oil delivery process to deliver hydraulic oil to the first connecting line 11, a supply process to supply hydraulic oil from the first connecting line 11 to the second connecting line 12, a pressure accumulating process to accumulate the hydraulic oil delivered from pump 2 to the first connecting line 11 in the accumulator 3, a pressure reducing supply process to introduce hydraulic oil from the first connecting line 11, reduce pressure, and then supply it to the second connecting line 12, and a discharge process to discharge the hydraulic oil from the first connecting line 11 to the third connecting line 13, it is possible to realize a hydraulic pressure supply method, wherein the pressure reducing supply process only reduces the hydraulic oil introduced and pressure reduced from the first connecting line 11 to the second connecting line 12, and the discharge process switches from a state in which the hydraulic oil in the first connecting line 11 is not discharged to the third connecting line 13 to a state in which the hydraulic oil in the first connecting line 11 is discharged to the third connecting line 13 when the pressure of the hydraulic oil in the first connecting line 11 is equal to or greater than the first pressure.

The following is a detailed description of the hydraulic pressure supply device and the hydraulic pressure supply method pertaining to this embodiment. In the following description, the downstream side in the direction of hydraulic oil flow may be referred to simply as the downstream side. For example, the second connecting line 12, to which the hydraulic oil is supplied from the first connecting line 11, is a connecting line connected to the downstream side of the first connecting line 11.

The pump 2 is a supply device that realizes a hydraulic oil delivery process in which the hydraulic oil stored in tank 71 is delivered to the first connecting line 11. A pump 2 is connected to the introduction connecting line 10 and the first connecting line 11, which introduce the hydraulic oil stored in tank 71. The pump 2 sucks up hydraulic oil from tank 71 via the introduction connecting line 10 and then delivers it to the first connecting line 11. The pump 2 may be driven, for example, by an electric motor 21.

The first connecting line 11 is the connecting line that supplies the hydraulic oil to the pressure reducing valve 4. The accumulator 3 and the valve device 5 are connected to the first connecting line 11, as described below.

The pressure reducing valve 4 is a valve mechanism that realizes the pressure reducing supply process that reduces the pressure of the hydraulic oil supplied from the first connecting line 11 (hereinafter referred to simply as "hydraulic pressure") and then supplies the hydraulic oil to the second connecting line 12. The pressure reducing valve 4 reduces the hydraulic pressure in the first connecting line 11 to a predetermined control pressure (10 MPa as an example) and then supplies the hydraulic oil to the second connecting line 12. The pressure reducing valve 4 should preferably be a so-called non-leak type pressure reducing valve.

The second connecting line 12 is the connecting line that delivers hydraulic oil to the hydraulic pressure system connected to the hydraulic pressure supply device. Moreover, the hydraulic pressure system is the hydraulic pressure circuit in the plant or on the mother machine that supplies hydraulic oil to the hydraulic pressure drive device in the mother machine.

The third connecting line 13 is a connecting line that returns the hydraulic oil supplied to the hydraulic pressure system and the hydraulic oil from the first connecting line 11 or the second connecting line 12 to the tank 71 (an example of a return process.) In this embodiment, as an example, the third connecting line 13 contains a first return line 14 that returns the hydraulic oil supplied to the hydraulic pressure system or the hydraulic oil from the second connecting line 12 to the tank 71, and a second return line 15 that returns the hydraulic oil from the first connecting line 11 to the tank 71. As shown in FIG. 1, the first return line 14 and the second return line 15 may be united on the downstream side (the side closer to the tank 71).

The accumulator 3 is a pressure accumulator that realizes a pressure accumulating process to accumulate the pressure energy of the hydraulic oil in the first connecting line 11. The accumulator 3 may have a container filled with gas and may accumulate hydraulic oil by pushing the hydraulic oil into the container filled with gas. In such an accumulator 3, the hydraulic oil compresses the gas and the container is filled with a quantity of hydraulic oil equivalent to the pushing force (pressure). In the accumulator 3, when the hydraulic pressure in the first connecting line 11 drops below the hydraulic pressure in the accumulator 3, the hydraulic oil stored in the accumulator 3 is released into the first connecting line 11, thereby reducing the hydraulic pressure drop in the first connecting line 11. The accumulator 3 is located between the pressure reducing valve 4 and the valve device 5 in the first connecting line 11. In other words, the accumulator 3 is connected to the downstream first connecting line 11*b*, which is the first connecting line 11 on the downstream side from a valve device 5.

The valve device 5 is a valve mechanism to switch from a state in which the hydraulic oil from the upstream side first connecting line 11*a*, which is the first connecting line 11 on the upstream side from the valve device 5, is not discharged into the third connecting line 13, to a state in which the hydraulic oil in the first connecting line 11*a* on the upstream side is discharged into the third connecting line 13 (an example of discharge process) if the hydraulic pressure in the downstream side first connecting line 11*b* is equal to or greater than the first pressure.

Figure 2:
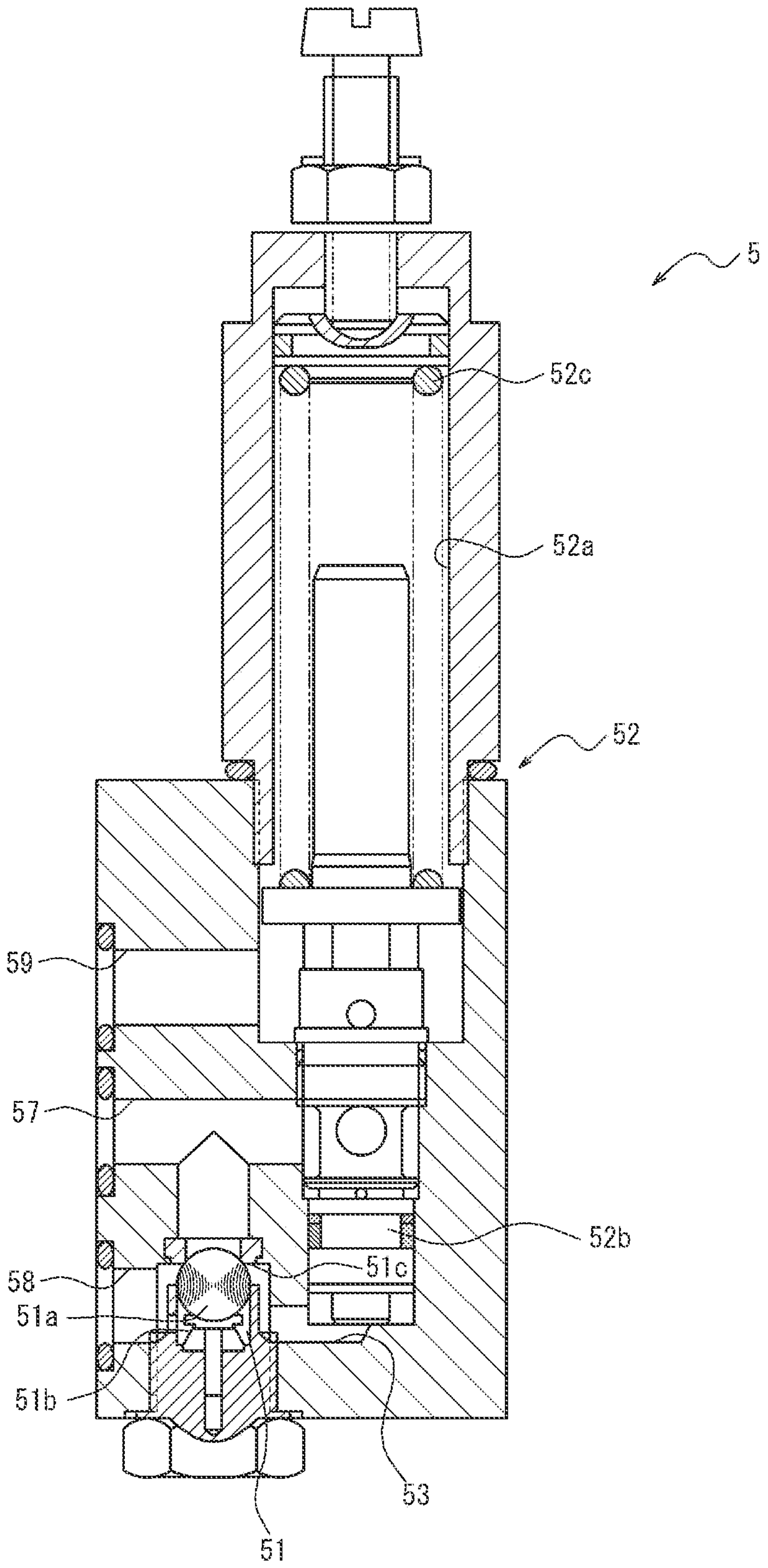
FIG. 2 is a cross-sectional view of the structure of the valve device.

FIG. 2 shows an example of the structure of the valve device 5. The valve device 5 has a first connection port 57 that is supplied with hydraulic oil from the upstream side first connecting line 11*a*, a second connection port 58 that returns the hydraulic oil supplied from the upstream side first connecting line 11*a* to the downstream side first connecting line 11*b* as the first connecting line 11, and a third connection port 58 that discharges the hydraulic oil supplied from the upstream side first connecting line 11*a* to the second return line 15, a check valve 51 that prevents the backflow of hydraulic oil from the second connection port 58 to the first connection port 57, and a switch valve 52 that switches between a state in which the first connection port 57 and the third connection port 59 are connected and a state in which they are not connected.

The check valve 51 has a valve body 51*a* supported by an elastic member, such as a spring 51*b*, etc.

In the check valve 51, if the flow of hydraulic oil from the upstream side of the check valve 51 (upstream side first connecting line 11*a*, first connection port 57) to the downstream side (downstream side first connecting line 11*b*, second connection port 58) is equal to or greater than a predetermined amount (equal to or greater than a predetermined differential pressure), the valve body 51*a* moves to the position where it connects the first connection port 57 and the second connection port 58, i.e., a position where the check valve 51 opens. With reference to FIG. 2, the valve body 51*a* is in a state away from the valve seat 51*c* (i.e., a position where the check valve 51 is open), and the first connection port 57 and the second connection port 58 are connected.

When the flow of hydraulic oil from the upstream side to the downstream side of the check valve 51 becomes less than a predetermined amount (i.e., the differential pressure drops below a predetermined level), the valve body 51*a* moves to the closed position blocking the flow path connecting the first connection port 57 and the second connection port 58, and then the check valve 51 becomes closed. This prevents the backflow of hydraulic oil from the downstream side of the check valve 51 to the upstream side. FIG. 2 shows a case in which the valve body 51*a* contacts the valve seat 51*c* configured between the first connection port 57 and the second connection port 58 and blocks the flow path connecting the first connection port 57 and the second connection port 58 (a case in which check valve 51 is in the closed state).

In the check valve 51, if the flow amount of hydraulic oil from the first connection port 57 to the second connection port 58 is greater than a predetermined amount, the push force of the flowing hydraulic oil to push the valve body 51*a* in the direction of opening the check valve 51 resists the push force of the spring 51*b* to push the valve body 51*a* in the direction of closing the check valve 51 to keep the check valve 51 in an open state, and keep the first connection port 57 and the second connection port 58 in the connected state. As a result, hydraulic oil is allowed to flow from the first connection port 57 to the second connection port 58.

In the check valve 51, if the flow amount of hydraulic oil from the first connection port 57 to the second connection port 58 is less than a predetermined amount, the push force of the spring 51*b* to push the valve body 51*a* in the direction of closing the check valve 51 resists the push force of the hydraulic oil trying to flow through the check valve 51 to push the valve body 51*a* in the direction of opening the check valve 51 and closes the check valve 51 to make the first connection port 57 and the second connection port 58 in a closed state. This prevents the flow of hydraulic oil from the first connection port 57 to the second connection port 58.

The switch valve 52 is a valve mechanism that is normally in the closed state, in which the first connection port 57 and the third connection port 59 are not connected, and switches to the opened state (open state) when the hydraulic pressure in the downstream side first connecting line 11*b* rises and exceeds the first pressure, to connect the first connection port 57 and the third connection port 59. In addition, the switch valve 52 switches from the open state to the closed state when the hydraulic pressure in the downstream side first connecting line 11*b* drops below the first return pressure (13.6 MPa as an example), which is lower than the first pressure. Moreover, in this embodiment, when the switch valve 52 is in the open state and the first connection port 57 and the third connection port 59 are connected, the flow amount of hydraulic oil from the upstream side to the downstream side of the check valve 51 becomes less than a predetermined amount, and the check valve 51 is in the closed state.

The switch valve 52 has a cylinder portion 52*a* connected to the first connection port 57 and the third connection port 59, a piston 52*b* housed within the cylinder portion 52*a*, an elastic member, such as a spring 52*c*, etc., that pushes one end of the piston 52*b* in the direction of extension of the cylinder portion 52*c*, and a pressure transmission connecting line 53 connecting the other end of the piston 52*b* (a side that is far from the spring 52*c*) in cylinder portion 52*a* to the first connection port 57. The first connection port 57 is connected to the other end of the piston 52*b* (a side that is far from the spring 52*c*) in the cylinder portion 52*a*. The third connection port 59 is connected to the side of one end of the piston 52*b* (the side of the spring 52*c*) in the cylinder portion 52*a*. In other words, the piston 52*b* is pushed by the spring 52*c* from the side of the third connection port 59 to the side of the first connection port 57.

The hydraulic pressure in the downstream side first connecting line 11*b* when the switch valve 52 is opened, i.e., the first pressure, can be adjusted by the spring constant in the spring 52*c*.

If the hydraulic pressure in the downstream side first connecting line 11*b* is less than the first pressure in the open state, the switch valve 52 works so that the push force of the spring 52*c* is greater than the push force of the hydraulic oil transmitted through the pressure transmission connecting line 53 to push the piston 52*b* toward the side of the spring 52*c*. In this way, when the switch valve 52 is in the open state and the hydraulic pressure in the downstream side first connecting line 11*b* is less than the first pressure, the piston

52*b* maintains a posture at the cylinder portion 52*a* that blocks the first connection port 57 or the third connection port 59, thereby preventing the flow of hydraulic oil from the first connection port 57 to the third connection port 59.

In the switch valve 52, if the hydraulic pressure in the downstream side first connecting line 11*b* exceeds the first pressure in the open state, the push force of the hydraulic oil transmitted through the pressure transmission connecting line 53 to push the piston 52*b* toward the side of the spring 52*c* is greater than the push force of the spring 52*c*. In this way, piston 52*b* moves to the side of the spring 52*c* to the position where the first connection port 57 and the third connection port 59 are connected to the cylinder portion 52*a*, and the switch valve 52*b* switches to the open state. Then, hydraulic oil is allowed to flow from the first connection port 57 to the third connection port 59, and it is in a state in which the hydraulic oil in the first connecting line 11 is discharged into the second return line 15.

If the hydraulic pressure in the downstream side first connecting line 11*b* is equal to or greater than the first pressure and switches to the open state, and then the hydraulic pressure in the downstream side first connecting line 11*b* is below the first return pressure again, the switch valve 52 will return to the closed state, i.e., the state in which the hydraulic oil in the upstream side first connecting line 11*a* is not discharged into the third connecting line 13.

By the operation of the check valve 51 and the switch valve 52 described above, the hydraulic pressure supply device automatically switches between the supply mode and the circulation mode as follows.

As shown in FIG. 1, valve device 5 is in a supply mode in which the hydraulic oil from the upstream side first connecting line 11*a* is supplied only to the downstream side first connecting line 11*b* of the valve device 5 until the hydraulic pressure in the downstream side first connecting line 11*b* reaches the first pressure after the pump 2 starts driving for the first time.

In the valve device 5, when the hydraulic pressure in the downstream side first connecting line 11*b* reaches or exceeds the first pressure, it switches to the circulation mode in which the hydraulic oil in the upstream side first connecting line 11*a* is discharged into the second return line 15. In addition, if the hydraulic pressure in the downstream side first connecting line 11*b* once reaches the first pressure and then drops to the first return pressure, the valve system 5 switches from the circulation mode to the supply mode. Then, until the hydraulic pressure in the downstream side first connecting line 11*b* reaches the first pressure again, it maintains the supply mode in which the hydraulic oil from the upstream side first connecting line 11*a* is fed to the downstream side first connecting line 11*b* of the valve device 5. When the hydraulic pressure in the downstream side first connecting line 11*b* reaches the first pressure again, it switches to the circulation mode. Hereafter, the switching between the circulation mode and the supply mode is repeated.

In the circulation mode, the hydraulic oil from pump 2 returns to the tank 71 at a lower pressure (pressure loss corresponding to the pressure loss in each connecting line and the valve device 5). In other words, in the circulation mode, the delivery pressure (discharge pressure) of the pump 2 is reduced. In the circulation mode, the check valve 51 is closed to separate the upstream side first connecting line 11*a* and the downstream side first connecting line 11*b*, preventing backflow. Then, the hydraulic pressure in the downstream side first connecting line 11*b* is maintained for a certain period of time by the hydraulic oil supplied from the accumulator 3.

In the circulation mode, the workload of the pump 2 can be reduced because the delivery pressure of the pump 2 decreases. For that reason, the energy consumed by the hydraulic pressure supply device can be reduced.

By the way, in the circulation mode, when the energy of the hydraulic pressure of the downstream side first connecting line 11*b* and accumulator 3 is consumed by the hydraulic pressure system and the hydraulic pressure of the downstream side first connecting line 11*b* becomes the first return pressure which is the pressure below the first pressure again, the spring 52*c* pushes the piston 52*b* back and returns to supply mode (see FIG. 2). In the circulation mode, by not stopping the pump 2, the hydraulic pressure in the downstream side first connecting line 11*b* can be increased instantly after the hydraulic pressure in the downstream side first connecting line 11*b* decreases.

The hydraulic pressure of the downstream side first connecting line 11*b* when returning from the circulation mode to the supply mode, i.e., the first return pressure, can be adjusted by the spring constant of the spring 52*c*, but the hysteresis between spring 52*c* and piston 52*b* results in a first return pressure that is less than the first pressure (see FIG. 2).

The series of operations of the valve device 5, i.e., switching between the circulation mode and the supply mode, is automatically performed by the energy of the hydraulic pressure. In other words, this embodiment does not require a solenoid valve to switch between the circulation mode and the supply mode, and therefore does not require electrical wiring or control mechanisms.

The hydraulic pressure supply device in this embodiment can supply a constant pressure for at least a certain period of time by accumulating pressure with accumulator 3 and operating valve device 5, even in the unlikely event that there is some trouble with the connected hydraulic pressure system. In detail, even if some trouble occurs in the connected hydraulic pressure system and the pressure in the downstream side first connecting line 11*b* or the second connecting line 12 is in a state in which it tends to drop, the pressure accumulation by the accumulator 3 and the operation of the valve device 5 can avoid keeping the workload of the pump 2 in a constantly high state. In addition, in this way, it is also possible to avoid problems caused by a temperature rise of the hydraulic oil. In addition, compared to the case where only on/off control of the pump 2 is performed instead of switching to the circulation mode, the pump 2 does not need to be operated and stopped frequently, thus extending the service life of the pump 2 and reducing failures of the pump 2. In addition, the pressure in the downstream side first connecting line 11*b* can be instantly restored when the pressure in the downstream side first connecting line 11*b* drops below a predetermined control pressure. Furthermore, compared to the case where the motor 21 of the pump 2 is driven by an inverter instead of switching to circulation mode and the output of the pump 2 is variable, there is no need to repeatedly increase and decrease the output of pump 2, so instantaneous recovery of the pressure in the downstream side first connecting line 11*b* is made possible when the pressure in the downstream side first connecting line 11*b* drops. In particular, if there is some kind of trouble with the hydraulic pressure system, the output rise and fall of the pump 2 will be repeated frequently, and although it is assumed that the drive control of the pump 2 may not be able to follow the pressure drop of the downstream side first connecting line 11*b*, the hydraulic pressure supply device in this embodiment can easily follow the pressure drop of the downstream side first connecting line 11*b*.

As described above, a pressure sensor 62 and a relief valve 72 may be connected to the first connecting line 11.

The pressure sensor 62 may also be, for example, a pressure switch connected to the downstream side first connecting line 11*b*. In the hydraulic pressure supply device pertaining to this embodiment, based on the pressure detected by pressure sensor 62, it may determine whether or not the hydraulic pressure in the downstream side first connecting line 11*b* is adequate (e.g., equal to or greater than the first return pressure) or control the operation state of the pump 2.

For example, based on the pressure detected by pressure sensor 62, the rotation and stopping of motor 21 may be controlled, thereby controlling the operating state of pump 2.

For example, a pressure sensor 62 can be used as a pressure switch to deliver a predetermined signal to stop the motor 21 of the pump 2 when the hydraulic pressure in the downstream side first connecting line 11*b* detected by the pressure sensor 62 becomes equal to or greater than the second pressure (an example of the hydraulic pressure detection process). In the following, the state in which motor 21 of the pump 2 is stopped in the hydraulic pressure supply device is referred to as the stop mode.

In the stop mode, the same as in the circulation mode, the check valve 51 is closed to disconnect the upstream side first connecting line 11*a* from the downstream side first connecting line 11*b*, and the hydraulic pressure in the downstream side first connecting line 11*b* is maintained by the accumulator 3 for a certain period of time.

After stopping the motor 21 and switching the hydraulic pressure supply device from the circulation mode to the stop mode, if the hydraulic pressure in the downstream side first connecting line 11*b* drops to be less than the second pressure, for example, drops to the second return pressure which is less than the second pressure (10.5 MPa as an example), the pressure sensor 62 sends a predetermined signal to drive the motor 21 of the pump 2, and then the hydraulic pressure supply device may be returned to the circulation mode.

By further equipping the hydraulic pressure supply device with a pressure sensor 62 as a pressure switch, the hydraulic pressure supply device can be switched between the supply mode, the circulation mode, and the stop mode. Moreover, when the hydraulic pressure supply device can be switched between the supply mode, the circulation mode, and the stop mode, the second pressure may also be less than the first pressure. The second return pressure may be less than the first return pressure.

By setting the first pressure, the first return pressure, the second pressure, and the second return pressure as described above, if the use of the stop mode is preferred over the circulation mode, the pressure sensor 62 can be activated and the hydraulic pressure supply device can be set to first operation mode, which switches between the supply mode and the stop mode. In addition, if the hydraulic pressure system has some trouble, for example, the use of the circulation mode is preferred over the stop mode, it is possible to switch from the first operation mode to the second operation mode by stopping the pressure sensor 62 and switching the hydraulic pressure supply device between the supply mode and the circulation mode.

If the second pressure is less than the first pressure, it is possible to avoid switching from the supply mode to the circulation mode before switching from the supply mode to the stop mode if it is desired to operate in the first operation mode.

In the stop mode, the pump 2 stops, so it is possible to further reduce energy consumed by the hydraulic pressure supply device than in the circulation mode. However, in the first operation mode, where the hydraulic pressure supply device uses the stop mode, it is necessary to repeat the operation and stopping of the pump 2 frequently in states in which the pressure of the downstream side first connecting line 11*b* or the second connecting line 12 is likely to drop due to some trouble in the hydraulic pressure system, for example. And, if the pressure in the downstream side first connecting line 11*b* drops below a predetermined control pressure due to trouble, there may be a delay in the recovery of the pressure in the downstream side first connecting line 11*b*. Thus, if the hydraulic pressure system has some trouble and the pressure in the downstream side first connecting line 11*b* or the second connecting line 12 is likely to drop, by setting the hydraulic pressure supply device to the second operating mode, maintaining the workload of the pump 2 in a constantly high state can be avoided, thereby avoiding failures due to a temperature rise of the hydraulic oil. In addition, it also allows for instantaneous recovery of the pressure in the downstream side first connecting line 11*b* if the pressure in the downstream side first connecting line 11*b* drops below a predetermined control pressure. In other words, with the second operation mode it will be possible to provide a more stable and constant hydraulic pressure for a longer period of time than the first operation mode, even if the connected hydraulic pressure system has some trouble.

Thus, the second operation mode has the characteristics of being more robust than the first operation mode in case of any trouble in the hydraulic pressure system. However, the use of the second operation mode is not limited to cases where some trouble occurs in the hydraulic pressure system, but may also be used according to the characteristics of the hydraulic pressure system (e.g., hydraulic oil consumption pattern).

The relief valve 72 is a valve mechanism that discharges the hydraulic oil from the downstream side first connecting line 11*b* to the second return line 15. The relief valve 72 is normally closed and maintains a state in which the hydraulic oil is not discharged from the downstream side first connecting line 11*b* to the second return line 15. The relief valve 72 opens when the hydraulic pressure in the downstream side first connecting line 11*b* reaches a monitored pressure higher than the first pressure (18 MPa as an example) to discharge the hydraulic oil from the downstream side first connecting line 11*b* to the second return line 15. The operation of this relief valve 72 can avoid the hydraulic pressure in the downstream side first connecting line 11*b* from exceeding the monitored pressure, which could cause a failure.

Other components of the hydraulic pressure supply device will be described below. The hydraulic pressure supply device may be equipped with other equipment as described below, as shown in FIG. 1.

The introduction connecting line 10 may be equipped with a filter 10*a*. The filter 10*a* removes foreign matter from the hydraulic oil introduced from tank 71.

A filter 11*c* may be provided in the first connecting line 11. The filter 11*c* removes foreign matter from the hydraulic oil flowing in the first connecting line 11. The filter 11*c* can be placed in between the valve device 5 and the accumulator 3.

The first return line 14 may have a filter 14*a* and a check valve 14*b* that bypasses the filter 14*a*. The check valve 14*b* may open when a predetermined differential pressure occurs between the upstream side and the downstream side. The filter 14*a* removes foreign matter from the hydraulic oil flowing through the first return line 14. If the filter 14*a* becomes clogged, the check valve 14*b* can open to maintain the flow of hydraulic oil in the first return line 14. In addition, the first return line 14 may be further equipped with a pressure sensor 61. The pressure sensor 61 may also be, for example, a differential pressure switch that operates based on the differential pressure between the inside and outside of the first return line 14. For example, if the pressure sensor 61 is installed on the upstream side from the filter 14*a*, the differential pressure detected by the pressure sensor 61 can be used to determine whether or not the filter 14*a* is clogged. If the pressure sensor 61 is a differential pressure switch, for example, when the differential pressure detected by the pressure sensor 61 exceeds a predetermined threshold value, based on a signal sent out from the pressure sensor 61 as a differential pressure switch, the hydraulic pressure supply device can be made to give some warning indication.

The downstream side first connecting line 11*a* and the second return line 15 may also be connected via the stop valve 81. The stop valve 64 is opened, for example, during maintenance or in case of an abnormality.

For example, a pressure gauge 12*a* may be installed in the second connecting line 12 to monitor whether or not the pressure reducing valve 4 is working properly and whether or not the hydraulic pressure of the hydraulic oil supplied from the first connecting line 11 is adequate (equal to or greater than the second return pressure in this embodiment).

The second connecting line 12 and the first return line 14 may be connected via a stop valve 82. The stop valve 82 is opened, for example, during maintenance or in the event of a malfunction.

A cooling device 91 may also be provided to cool the hydraulic oil stored in pump 2, motor 21 or tank 71. An example of a cooling device 91 is a fan for air cooling. In FIG. 1, the case in which pump 2, motor 21, and tank 71 are housed in a storage chamber 9 is shown as an example, and cooling air is blown into the storage chamber 9 from a fan that is the cooling device 91. In this case, the storage chamber 9 may also be provided with pressure switches 92 and 93. For example, when the temperature of the storage chamber 9 rises above a predetermined cooling start temperature, the pressure switch 92 may start operation of the cooling device 91. In addition, when the temperature of the storage chamber 9 falls below the predetermined cooling stop temperature, the pressure switch 93 may stop the operation of the cooling device 91.

In this way, a hydraulic pressure supply device and a hydraulic pressure supply method can be provided.

Moreover, the configuration disclosed in the above embodiments (including other embodiments, the same hereinafter) can be applied in combination with the configuration disclosed in other embodiments as long as no contradiction arises, and the embodiments disclosed herein are examples, and the embodiments of this invention are not limited thereto and can be modified as appropriate to the extent that the purpose of this invention is not departed from.

INDUSTRIAL APPLICABILITY

This invention is applicable to a hydraulic pressure supply device and hydraulic pressure supply method.

DESCRIPTION OF THE REFERENCE NUMERALS

List of Reference Symbols

10: introduction connecting line
10*a*: filter
11: first connecting line
11*a*: upstream side first connecting line
11*b*: downstream side first connecting line
11*c*: filter
12: second connecting line
13: third connecting line
14: first return line
14*a*: filter
14*b*: check valve
15: second return line
2: pump
21: motor
3: accumulator
4: pressure reducing valve
5: valve device
51: check valve
51*a*: valve body
51*b*: spring
51*c*: valve seat
52: switch valve
52*a*: cylinder portion
52*b*: piston
52*c*: spring
53: pressure transmission connecting line
57: first connection port
58: second connection port
59: third connection port
61: pressure sensor
62: pressure sensor
64: stop valve
71: tank
72: relief valve
81: stop valve
82: stop valve
9: storage chamber
91: cooling device
92: pressure switch
93: pressure switch

The invention claimed is:

1. A hydraulic pressure supply device, comprising:
a first connecting line;
a pump that delivers hydraulic oil to the first connecting line;
a second connecting line to which the hydraulic oil is fed from the first connecting line;
a third connecting line to which the hydraulic oil returns from the second connecting line;
an accumulator connected to the first connecting line to store the hydraulic oil delivered from the pump;
a pressure reducing valve that reduces the pressure of the hydraulic oil introduced from the first connecting line and then supplies the hydraulic oil to the second connecting line;
a valve device that discharges the hydraulic oil from the first connecting line into the third connecting line;
a relief valve connected to the first connecting line to discharge the hydraulic oil from a downstream side of the first connecting line to a second return line; and
a pressure sensor in the first connecting line;

wherein:

the second connecting line is connected to the first connecting line only via the pressure reducing valve;

the pump stops when the pressure of the hydraulic oil in the first connecting line, as detected by the pressure sensor, exceeds a second pressure;

the valve device switches from a state of not discharging the hydraulic oil in the first connecting line into the third connecting line to a state of discharging the hydraulic oil in the first connecting line into the third connecting line when the hydraulic oil pressure in the first connecting line is equal to or greater than a first pressure;

a first operation mode that switches between a supply mode in which the hydraulic oil in the first connecting line is not discharged into the third connecting line and a stop mode in which the pump is stopped can be switched to a second operation mode that switches between the supply mode and a circulation mode in which the hydraulic oil in the first connecting line is discharged into the third connecting line;

the valve device switches between the circulation mode and the supply mode purely hydraulically;

the pressure relief valve opening when a monitored pressure in the first connecting line is reached;

the monitored pressure being higher than the first pressure; and the second pressure being less than the first pressure.

2. A hydraulic pressure supply method, comprising:

in a hydraulic oil delivery process, delivering hydraulic oil to a first connecting line;

in a returning process, returning the hydraulic oil from a second connecting line to a third connecting line;

in a pressure accumulating process, accumulating the hydraulic oil delivered to the first connecting line in an accumulator;

in a pressure reducing supply process, introducing the hydraulic oil from the first connecting line, reducing the pressure, and then supplying the hydraulic oil to the second connecting line;

discharging the hydraulic oil from a downstream side of the first connecting line to a second return line through a relief valve connected to the first connecting line; and in a discharge process, discharging the hydraulic oil from the first connecting line into the third connecting line through a valve device;

wherein:

the pressure reducing supply process supplies only the hydraulic oil that has been introduced from the first connecting line and pressure reduced to the second connecting line;

the discharge process switches from a state in which the hydraulic oil from the first connecting line is not discharged into the third connecting line to a state in which the hydraulic oil from the first connecting line is discharged into the third connecting line if a pressure of the hydraulic oil in the first connecting line is equal to or greater than a first pressure;

the pressure relief valve opening when a monitored pressure in the first connecting line is reached;

the monitored pressure being higher than the first pressure; and the second pressure being less than the first pressure;

wherein:

the method further comprises a first operation mode that switches between a supply mode in which the hydraulic oil from the first connecting line is not discharged into the third connecting line and a stop mode in which the delivery of the hydraulic oil to the first connecting line is stopped, and can be switched to a second operation mode that switches between the supply mode and a circulation mode in which the hydraulic oil from the first connecting line is discharged into the third connecting line.

3. The hydraulic pressure supply method according to claim 2, further comprising:

in a hydraulic pressure detection process, detecting the pressure of the hydraulic oil in the first connecting line;

wherein the hydraulic pressure detection process stops the delivery of the hydraulic oil to the first connecting line if the pressure of the hydraulic oil in the first connecting line exceeds a second pressure.

* * * * *